(12) United States Patent
Wang et al.

(10) Patent No.: US 11,250,549 B2
(45) Date of Patent: Feb. 15, 2022

(54) METHOD, APPARATUS AND ELECTRIC DEVICE FOR IMAGE FUSION

(71) Applicant: MEGVII (BEIJING) TECHNOLOGY CO., LTD., Beijing (CN)

(72) Inventors: Jue Wang, Beijing (CN); Haibin Huang, Beijing (CN)

(73) Assignee: MEGVII (BEIJING) TECHNOLOGY CO., LTD., Beijing (CN)

( * ) Notice: Subject to any disclaimer, the term of this patent is extended or adjusted under 35 U.S.C. 154(b) by 65 days.

(21) Appl. No.: 16/850,668

(22) Filed: Apr. 16, 2020

(65) Prior Publication Data

US 2020/0342580 A1  Oct. 29, 2020

(30) Foreign Application Priority Data

Apr. 25, 2019 (CN) .......................... 201910337716.3

(51) Int. Cl.
*G06T 5/50* (2006.01)

(52) U.S. Cl.
CPC ...... *G06T 5/50* (2013.01); *G06T 2207/20221* (2013.01)

(58) Field of Classification Search
CPC . G06T 5/008; G06T 5/50; G06T 2207/10144; G06T 2207/20208; G06T 2207/20221
See application file for complete search history.

(56) References Cited

U.S. PATENT DOCUMENTS

| 11,025,830 | B1* | 6/2021 | Haynold | G06T 7/30 |
| 2012/0183210 | A1* | 7/2012 | Zheng | G06T 5/009 |
| | | | | 382/162 |
| 2018/0302544 | A1* | 10/2018 | Dhiman | G06T 7/246 |

FOREIGN PATENT DOCUMENTS

| CN | 106355569 A | 1/2017 | |
| CN | 107025641 A | 8/2017 | |
| CN | 107203985 A | 9/2017 | |
| CN | 109146798 A | 1/2019 | |
| CN | 109215003 A | 1/2019 | |
| WO | WO-2010050632 A1 * | 5/2010 | ......... H04N 5/23248 |

OTHER PUBLICATIONS

Q. Wang, X. Fu, X. Zhang and X. Ding, "A fusion-based method for single backlit image enhancement," 2016 IEEE International Conference on Image Processing (ICIP), 2016, pp. 4077-4081, doi: 10.1109/ICIP.2016.7533126 (Year: 2016).*
First Office Action with translation for Chinese Application No. 201910337716.3, dated Nov. 2, 2020.

* cited by examiner

*Primary Examiner* — Emily C Terrell
*Assistant Examiner* — Molly Delaney
(74) *Attorney, Agent, or Firm* — Marshall, Gerstein & Borun LLP (57) ABSTRACT

The present disclosure provides a method, an electronic device, and a medium for image fusion. The method includes calculating a fusion coefficient image M based on a first frame image I1 or based on both the first frame image I1 and a second frame image I2; calculating a first gradient D1 of the first frame image I1 and a second gradient D2 of the second frame image I2; calculating a preliminary fusion result J based on the image M, the first gradient D1 and the second gradient D2; and obtaining an output image I3 based on the image M, the first gradient D1, the second gradient D2 and the preliminary fusion result J, wherein brightness of the first frame image I1 is greater than brightness of the second frame image I2, and wherein the image M is used to mark fusion weights of pixels in the first frame image I1.

18 Claims, 9 Drawing Sheets

METHOD, APPARATUS AND ELECTRIC DEVICE FOR IMAGE FUSION

CROSS-REFERENCE TO RELATED APPLICATION

The present application claims the priority of Chinese patent application No. 201910337716.3 filed on Apr. 25, 2019, the disclosure of which is incorporated herein by reference in its entirety.

TECHNICAL FIELD

The present disclosure relates to image processing, and more particularly, to a method, apparatus, electronic device, and computer readable storage medium for image fusion.

BACKGROUND

When taking pictures, due to the limitation of the dynamic range of the camera itself, in some scenes, for example, in scenes with high dynamic range such as the night scene of a city, it is difficult to take the details of both the highlighted area and the dark area with one photo. A common nightscape shooting mode is to synthesize images using multiple pictures, and its principle is to quickly continuous shoot multiple photos, each with different settings such as exposure time and/or ISO, capture highlight details with short exposure and/or low ISO images, capture dark details with long exposure and/or high ISO images, and finally fuse the details of multiple images together with a fusion algorithm to form a fused image. The fused image may be referred to as a High Dynamic Range (HDR) image.

There are many kinds of image fusion algorithms, such as the most common exposure fusion method.

SUMMARY

The present disclosure has been made in view of the above, and provides a method, apparatus, electronic device, and computer readable storage medium for image fusion.

According to an aspect of the present disclosure, an image fusion method includes calculating a fusion coefficient image M based on a first frame image $I_1$ or based on both the first frame image $I_1$ and a second frame image $I_2$; calculating a first gradient $D_1$ of the first frame image $I_1$ and a second gradient $D_2$ of the second frame image $I_2$; calculating a preliminary fusion result J based on the calculated fusion coefficient image M, the first gradient $D_1$ and the second gradient $D_2$; and obtaining an output image $I_3$ based on the calculated fusion coefficient image M, the first gradient $D_1$, the second gradient $D_2$ and the preliminary fusion result J, wherein brightness of the first frame image $I_1$ is greater than brightness of the second frame image $I_2$, and wherein the fusion coefficient image M is used to mark fusion weights of pixels in the first frame image $I_1$.

According to another aspect of the present disclosure, there is provided an electronic apparatus for image fusion, the electronic apparatus including: a receiving unit operable to receive image frames to be fused; a fusion unit operable to perform the following operations: calculating a fusion coefficient image M based on a first frame image $I_1$ or based on both the first frame image $I_1$ and a second frame image $I_2$; calculating a first gradient $D_1$ of the first frame image $I_1$ and a second gradient $D_2$ of the second frame image $I_2$; calculating a preliminary fusion result J based on the calculated fusion coefficient image M, the first gradient $D_1$ and the second gradient $D_2$; and obtaining an output image $I_3$ based on the calculated fusion coefficient image M, the first gradient $D_1$, the second gradient $D_2$ and the preliminary fusion result J, wherein brightness of the first frame image $I_1$ is greater than brightness of the second frame image $I_2$, and wherein the fusion coefficient image M is used to mark fusion weights of pixels in the first frame image $I_1$; and an output unit operable to output the output image $I_3$.

According to yet another aspect of the present disclosure, there is provided an electronic device for image fusion, the electronic device including a processor and a memory having instructions stored thereon that, when executed by the processor, cause the processor to perform the image fusion method as previously described.

According to yet another aspect of the present disclosure, there is provided a computer readable storage medium storing instructions that, when executed by a processor, cause the processor to perform the image fusion method as previously described.

As will be described in detail below, the image fusion method according to an embodiment of the present disclosure is a new image fusion method based on image gradient fusion and reconstruction. The method fuses a plurality of photos with different settings of exposure times and/or ISO etc., so that a better fusion effect can be obtained in some scenes, e.g. in backlighting scenes of daytime. In addition, as will be described in detail below, the present disclosure also provides an apparatus, an electronic device, and a computer readable storage medium for implementing the disclosed new image fusion method.

It should be understood that both the foregoing general description and the following detailed description are exemplary and are intended to provide further explanation of the claimed technology and are not intended to limit the technical concept of the present disclosure.

BRIEF DESCRIPTION OF THE DRAWINGS

The above and other objects, features and advantages of the present disclosure will become more apparent by describing embodiments of the disclosure in more detail in connection with the accompanying drawings. The accompanying drawings are used to provide a further understanding of the embodiments of the present disclosure and form a part of the specification. The accompanying drawing together with the embodiments of the present disclosure are used to explain the present disclosure, but are not to be construed as limiting the present disclosure. In the drawings, the same reference numerals refer to the same parts, steps or elements unless explicitly indicated otherwise. In the drawings.

DETAILED DESCRIPTION

In order to make the objects, technical solutions and advantages of the present disclosure more obvious, exemplary embodiments according to the present disclosure will be described in detail below in connection with the accompanying drawings. Obviously, the described embodiments are only a part of the embodiments of the present disclosure and not all of the embodiments of the present disclosure, and it should be understood that the present disclosure is not limited to the example embodiments described herein.

Figure 1:
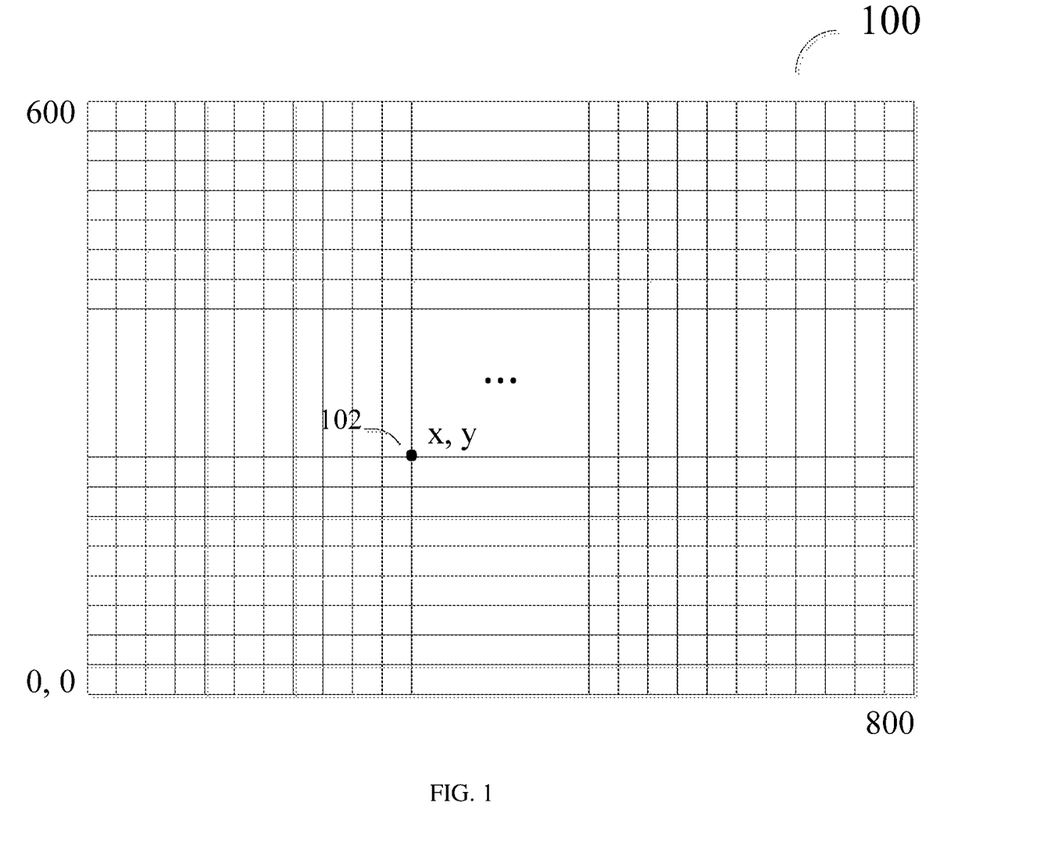
FIG. 1 is a pixel grid diagram of an image with an example resolution according to an embodiment of the present disclosure.

First, referring to FIG. 1, FIG. 1 is a pixel grid diagram of an image 100 with an example resolution according to an embodiment of the present disclosure.

Referring to FIG. 1, the example image 100 described in FIG. 1 is an image with a resolution of 800×600. The pixels of the image 100 in FIG. 1 can be represented by the intersection of 800 lines on the horizontal axis and 600 lines on the vertical axis. In the embodiment of the present disclosure, each pixel in the image 100, for example, a pixel 102, may be represented by (x, y), wherein a value range of x is [0, 800], including 0 and 800; a value range of y is [0, 600], including 0 and 600. It should be understood that although the image 100 with the resolution 800×600 is illustrated in FIG. 1, the present disclosure is not limited to a resolution of an image, that is, the method, apparatus, electronic device, and computer readable storage medium for image fusion according to embodiments of the present disclosure are suitable for fusing images with any resolutions, for example, images with a resolution of 320×240, 800×600, 1024×768 or 4096×3072.

Hereinafter, an example flow of an image fusion method to use two frame images according to an embodiment of the present disclosure will be described in detail in connection with FIGS. 2 to 6. For convenience of explanation, in the following description, it is assumed that the two frame images are a first frame image $I_1$ and a second frame image $I_2$, wherein brightness of the first frame image $I_1$ is greater than brightness of the second frame image $I_2$. That is, for the first frame image $I_1$ and the second frame image $I_2$, the first frame image $I_1$ is a bright frame and the second frame image $I_2$ is a dark frame. In the present disclosure, the bright frame is an image that captures dark-part details in two frame images; the dark frame is an image that captures highlight details in two frame images. In some embodiments of the present disclosure, the bright frame may be an image with longer exposure time in the two images and the dark frame may be an image with shorter exposure time in the two images, under the same other settings. Alternatively or additionally, in other embodiments of the present disclosure, the bright frame may be an image with a higher ISO in the two images and the dark frame may be an image with a lower ISO in the two images, under the same other settings. Alternatively or additionally, in still other embodiments of the present disclosure, the bright frame may be an image that captures the dark-part details by setting both the exposure time and ISO, and the dark frame is an image that captures the highlight details. It should be understood that although the bright frame and the dark frame under various exposure times and/or IOS setting scenes are described in the foregoing description, embodiments of the present disclosure are not limited to the foregoing description.

Figure 2:
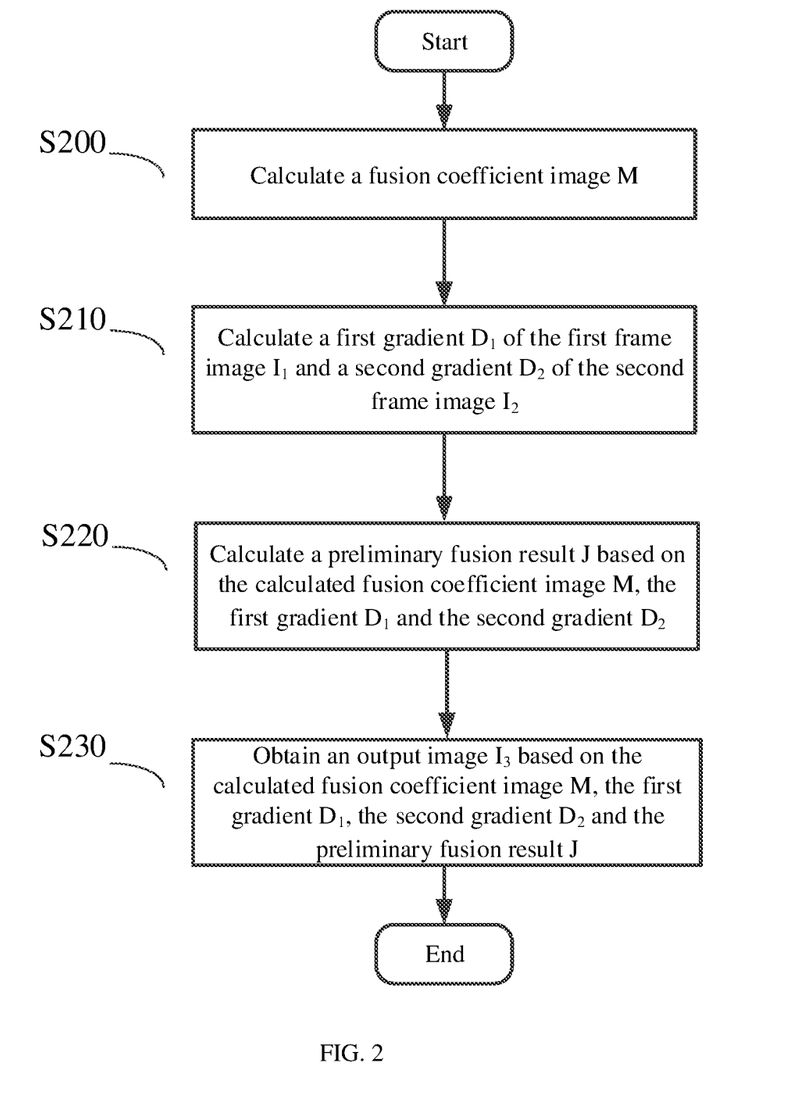
FIG. 2 is an example flowchart illustrating an image fusion method to fuse two frame images according to an embodiment of the present disclosure.

FIG. 2 is an example flowchart illustrating an image fusion method to fuse two frame images according to an embodiment of the present disclosure.

Referring to FIG. 2, an example flow of an image fusion method to fuse two frame images according to an embodiment of the present disclosure may start at step S200. At step S200, a fusion coefficient image M is calculated, wherein the fusion coefficient image M is used to mark fusion weights of pixels in bright frames of two frame images, for example the first frame image $I_1$. In some embodiments of the present disclosure, the fusion coefficient image M marks pixels expected to be replaced in a bright frame, and for one pixel (x, y), for example, the pixel 102, M(x, y) in FIG. 1, is a value within [0,255], including 0 and 255; where 255 represents that this pixel is overexposed in the bright frame and needs to be filled with information of a dark frame; On the contrary, 0 represents that this pixel does not need fusion; (0,255), excluding 0 and 255, represents that the current pixel needs to be interpolated between bright and dark frames.

After that, the method may proceed to step S210. At step S210, a first gradient $D_1$ of the first frame image $I_1$ and a second gradient $D_2$ of the second frame image $I_2$ are calculated. Specifically, the first gradient $D_1$ of the first frame image $I_1$ and the second gradient $D_2$ of the second frame image $I_2$ may be calculated according to the following equations (1) and (2).

$$\begin{cases} D_1 \wedge x(x, y) = 0 & \text{if } x = 0 \\ D_1 \wedge y(x, y) = 0 & \text{if } y = 0 \\ \text{else} \\ D_1 \wedge x(x, y) = D_1(x, y) - D_1(x-1, y) \\ D_1 \wedge y(x, y) = D_1(x, y) - D_1(x, y-1) \end{cases} \quad (1)$$

$$\begin{cases} D_2 \wedge x(x, y) = 0 & \text{if } x = 0 \\ D_2 \wedge y(x, y) = 0 & \text{if } y = 0 \\ \text{else} \\ D_2 \wedge x(x, y) = D_2(x, y) - D_2(x-1, y) \\ D_2 \wedge y(x, y) = D_2(x, y) - D_2(x, y-1) \end{cases} \quad (2)$$

After calculating the fusion coefficient image M, the first gradient $D_1$ and the second gradient $D_2$, the method may proceed to step S220. At step S220, a preliminary fusion result J is calculated based on the calculated fusion coefficient image M, the first gradient $D_1$, and the second gradient $D_2$. The calculation of the preliminary fusion result J based on the calculated fusion coefficient image M, the first gradient $D_1$ and the second gradient $D_2$ can be considered as a gradient reconstruction process. Specifically, in some embodiments, the preliminary fusion result J may be calculated based on the fusion coefficient image M, the first gradient $D_1$, and the second gradient $D_2$ according to the following equation (3):

$$J(x,y)=D_1(x,y)*(255-M(x,y))+M(x,y)*D_2(x,y) \quad (3)$$

Where J(x, y) represents a value of the preliminary fusion result J at pixel (x, y), $D_1$ (x, y) represents a gradient value of the first gradient $D_1$ at pixel (x, y), $D_2$ (x, y) represents a gradient value of the second gradient $D_2$ at pixel (x, y), M(x, y) represents a value of the fusion coefficient image M at pixel (x, y), and x, y are non-negative integers.

There will be obvious fusion edges in the preliminary fusion result image, so it is not the most ideal to take the preliminary fusion result image as the output image. However, in some scenes, for example, in scenes where the viewer does not pay much attention to the fusion edges, the preliminary fusion result image can be directly output as the fusion image.

After that, the method may proceed to step S230. At step S230, an output image $I_3$ is obtained based on the calculated fusion coefficient image M, the first gradient $D_1$, the second gradient $D_2$, and the preliminary fusion result J. The output image $I_3$ is the fused image. The output image $I_3$ fuses dark-part details captured by a bright frame (e.g., the first frame image $I_1$) and highlight details captured by a dark frame (e.g., the second frame image $I_2$), so that the fused image $I_3$ can present more details than a single bright frame or a single dark frame.

In the process of fusing two frame images, the first frame image $I_1$ and the second frame image $I_2$, by the image fusion method according to the embodiment of the present disclosure described in connection with FIG. 2, the first frame image $I_1$ and the second frame image $I_2$ may be any two frame images with different brightness, and the output image $I_3$ may be a fused image to be output, or may be used as an input image in the next fusion process. For example, in the case where image frames to be fused is only two frames, the first frame image $I_1$ and the second frame image $I_2$ are two frame images to be fused and brightness of the first frame image $I_1$ is greater than brightness of the second frame image $I_2$, and the output image $I_3$ will be output as a fused image. In the case where the image frames to be fused are multi-frame images (more than 2 images), the first frame image $I_1$ and the second frame image $I_2$ (in the first fusion) are two images with the highest brightness among the image frames to be fused or two images with the lowest brightness among the image frames to be fused; or (in non-first fusion) the first frame image $I_1$ and the second frame image $I_2$ are a fusion result of the previous fusion and non-fused image frames among the image frames to be fused. Specifically, in the case where the first frame image $I_1$ and the second frame image $I_2$ for an initial fusion are the two images with the highest brightness among the image frames to be fused, the first frame image $I_1$ and the second frame image $I_2$ are a result output image $I_3$ of the last fusion and the frame image with the highest brightness among non-fused image frames of the image frames to be fused, respectively; and in the case where the first frame image $I_1$ and the second frame image $I_2$ for the initial fusion are the two images with the lowest brightness among the image frames to be fused, the first frame image $I_1$ and the second frame image $I_2$ are the frame image with the lowest brightness among the non-fused image frames of the image frames to be fused and the result output image $I_3$ of the previous fusion, respectively.

The image fusion method described above in connection with FIG. 2 is a new image fusion method based on image gradients. The new image fusion method can fuse multiple photos with different settings of exposure time and/or ISO and the like together, so that a better fusion effect can be obtained in some scenes, for example in backlighting scenes of daytime.

Figure 3:
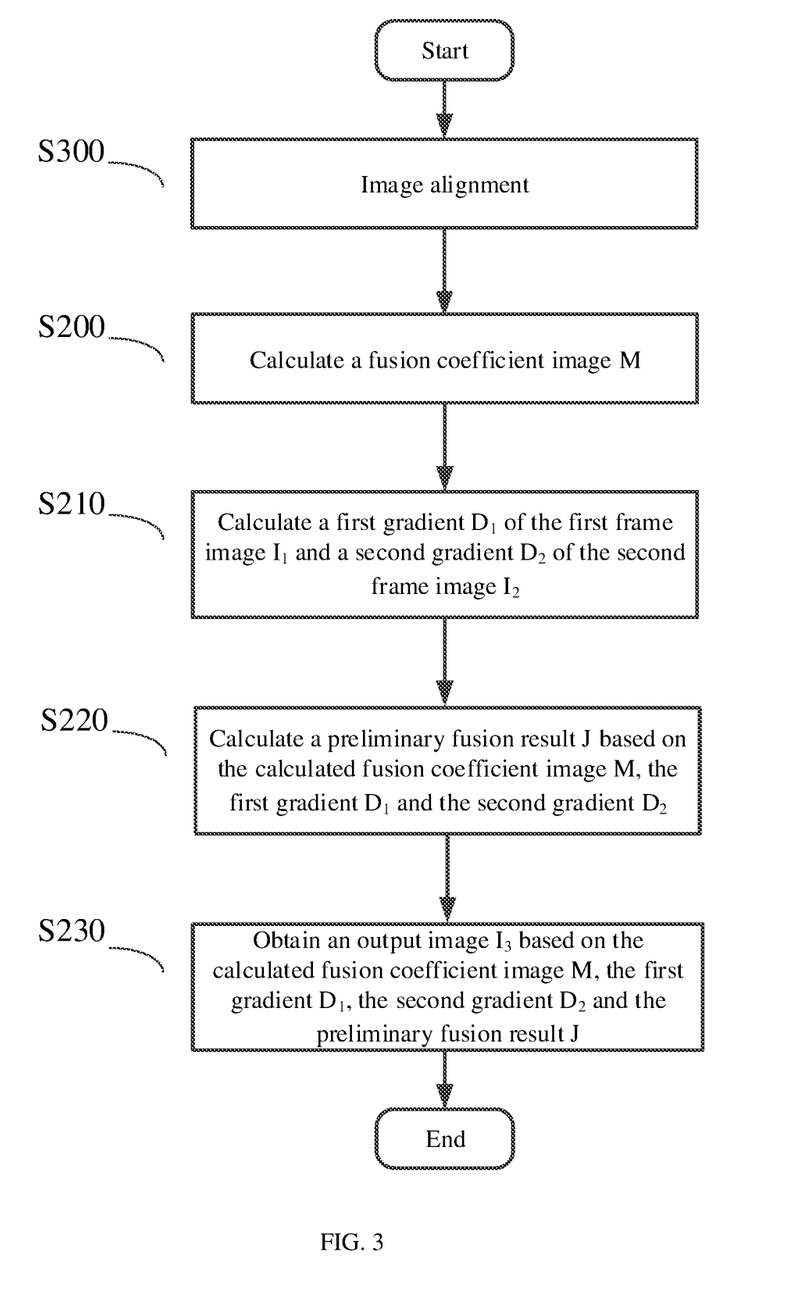
FIG. 3 is another example flowchart illustrating an image fusion method to fuse two frame images according to an embodiment of the present disclosure.

FIG. 3 is another example flowchart illustrating an image fusion method to fuse two frame images according to an embodiment of the present disclosure. Compared with the example flow of the image fusion method to fuse two frame images according to the embodiment of the present disclosure shown in FIG. 2, the example flow of the image fusion method to fuse two frame images (e.g. the first frame image $I_1$ and the second frame image $I_2$, wherein the first frame image $I_1$ is a bright frame and the second frame image $I_2$ is a dark frame) according to the embodiment of the present disclosure shown in FIG. 3 includes step S300 in addition to step S200, step S210, step S220 and step S230. That is, the image fusion method according to the embodiment of the present disclosure shown in FIG. 3 further performs an alignment operation before performing step S200 in which the fusion coefficient image M is calculate. The image alignment operation can eliminate the phenomenon of image misalignment due to camera shake. Specifically, in some embodiments of the present disclosure, an image alignment method of mesh flow[ ] may be used to align input images, e.g. the first frame image $I_1$ and the second frame image $I_2$. Alternatively, in other embodiments of the present disclosure, the input images, e.g. the first frame image $I_1$ and the second frame image $I_2$ may be aligned by using a global image alignment method based on homography.

Compared with the image fusion method described in connection with FIG. 2, the image fusion method described in connection with FIG. 3 further performs the image alignment operation before performing image fusion. The image alignment operation can eliminate the phenomenon of image misalignment due to camera shake and the like, thereby achieving better fusion effect under the condition that images to be fused have the phenomenon of image misalignment.

In addition, in some embodiments, it is difficult to align images due to the large brightness difference between bright frames and dark frames. Therefore, before using standard image alignment algorithms, e.g. the image alignment method of mesh flow[ ] or the global image alignment method based on homography, the dark frames can be brightness compensated first. Specifically, the dark frames can be brightness compensated according to the following equation (4).

$$I_2'=I_2*b_2/b_1 \quad (4)$$

Where $I_2'$ is the compensated image of the second frame image $I_2$ (the dark frame), $b_1$ is an average gray value of the first frame image $I_1$ (the bright frame), and $b_2$ is an average gray value of the second frame image $I_2$. The stability of image alignment can be enhanced through brightness compensation for the dark frames before image alignment.

In the above, example flows of image fusion methods to fuse two frame images according to the embodiments of the present disclosure are described in connection with FIGS. 2 and 3. Hereinafter, step S200 in FIG. 2 or FIG. 3, i.e., calculating the fusion coefficient image M, is further described herein in conjunction with FIGS. 4 and 5; and step S230 in FIG. 2 or FIG. 3 i.e., obtaining the output image $I_3$ based on the calculated fusion coefficient image M, the first gradient $D_1$, the second gradient $D_2$ and the preliminary fusion result J, is further described in connection with FIG. 6.

Figure 4:
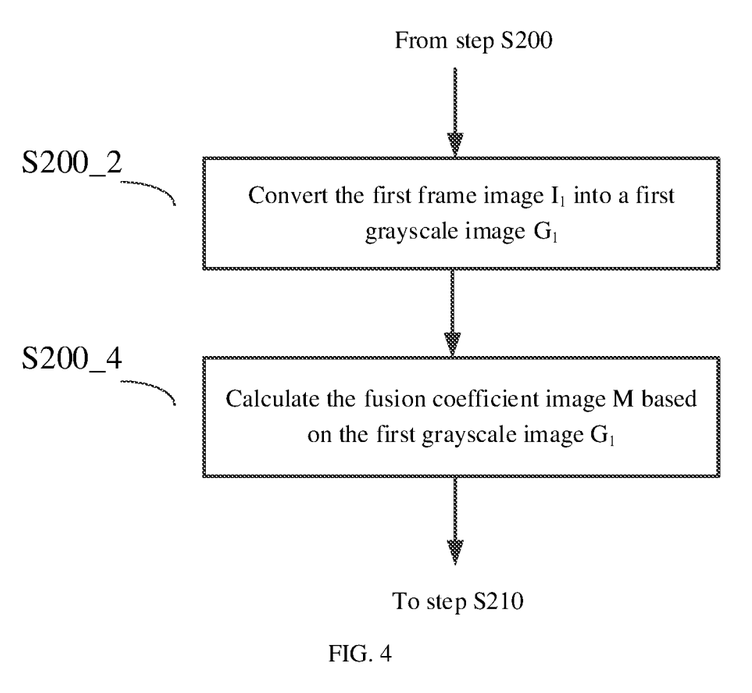
FIG. 4 is a schematic flowchart further illustrating a calculation of fusion coefficient image M in FIG. 2 or FIG. 3.

FIG. 4 is a schematic flow chart further illustrating the calculation of the fusion coefficient image M in FIG. 2 or FIG. 3.

Referring to FIG. 4, in some embodiments of the present disclosure, the step S200 in FIG. 2 or FIG. 3, calculating the fusion coefficient image M may include step S200_2 and step S200_4. At step S200_2, the first frame image $I_1$ is converted into a first grayscale image $G_1$. After converting the first frame image $I_1$ into the first grayscale image $G_1$, the fusion coefficient image M is calculated based on the first grayscale image $G_1$. Specifically, in some embodiments, the fusion coefficient image M may be calculated according to the following Equation (5):

$$M(x,y)=255-(255-G_1(x,y))*\gamma \qquad (5)$$

Where M(x, y) represents the value of the fusion coefficient image M at pixel (x, y) (e.g., pixel 102 in FIG. 1), $G_1$ (x, y) represents a gray value of the first gray image $G_1$ at pixel (x, y), γ is a positive constant, and x and y are non-negative integers. In some embodiments, γ may belong to (0, 255], i.e., any constant between 0 and 255 (including 255, but excluding 0), e.g. 10 or 12.5.

Figure 5:
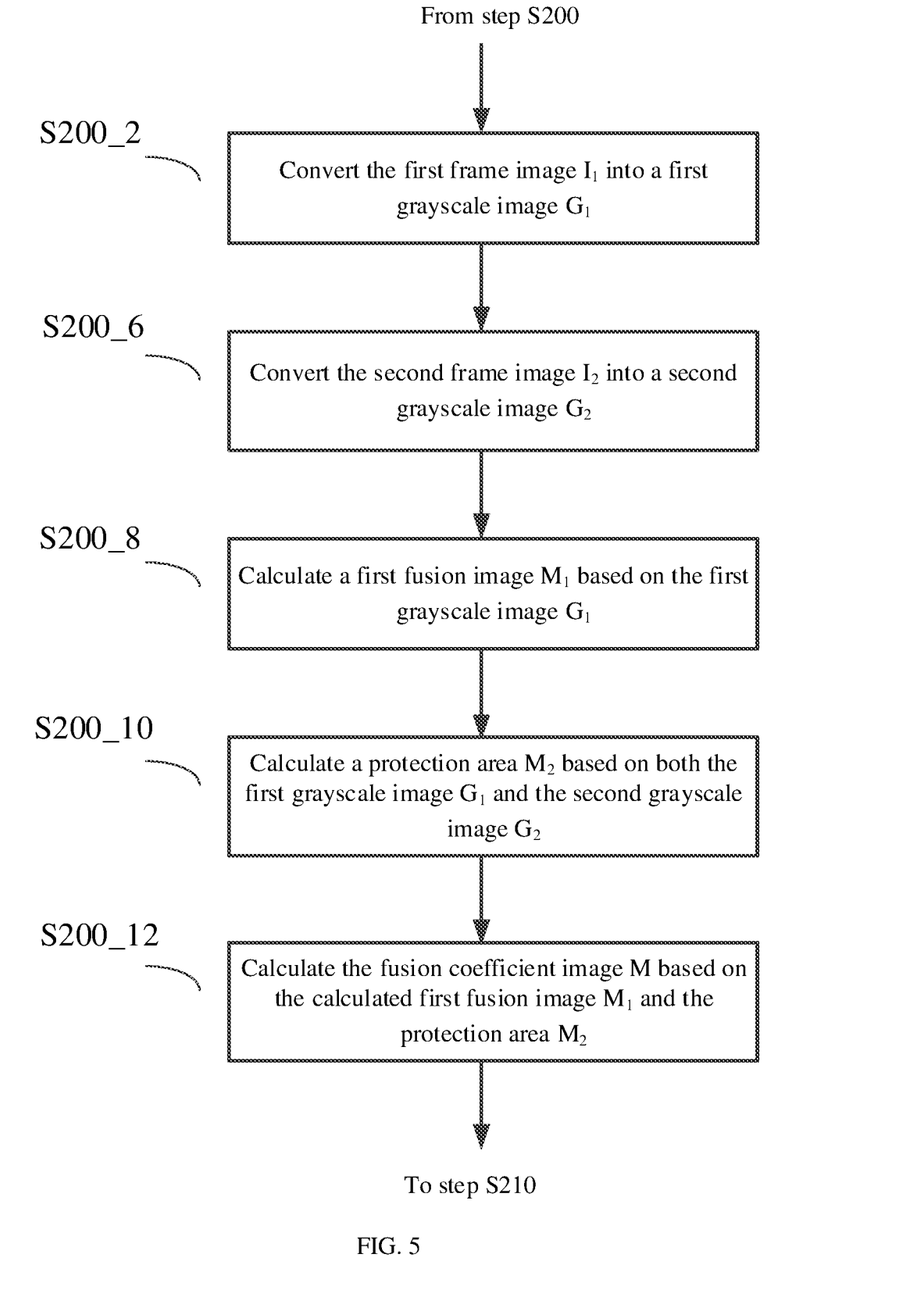
FIG. 5 is another schematic flowchart further illustrating a calculation of fusion coefficient image M in FIG. 2 or FIG. 3.

FIG. 5 is another schematic flow chart further illustrating the calculation of the fusion coefficient image M in FIG. 2 or FIG. 3.

Referring to FIG. 5, in some embodiments of the present disclosure, the step S200 in FIG. 2 or FIG. 3, calculating the fusion coefficient image M may include step S200_2, step S200_6, step S200_8, step S200_10, and step S200_12. At step S200_2, the first frame image $I_1$ is converted into a first grayscale image $G_1$. At step S200_6, the second frame image $I_2$ is converted into a second grayscale image $G_2$. At step S200_8, a first fusion image $M_1$ is calculated based on the first grayscale image $G_1$. Specifically, in some embodiments, the first fusion image $M_1$ may be calculated according to the following Equation (6):

$$M_1(x,y)=255-(255-G_1(x,y))*\gamma \qquad (6)$$

Where $M_1$ (x, y) represents a value of the first fusion image $M_1$ at pixel (x, y) (e.g., pixel 102 in FIG. 1), $G_1$ (x, y) represents a gray value of the first gray image $G_1$ at the pixel (x, y), γ is a positive constant, and x and y are non-negative integers. As the same as described above in connection with FIG. 4, γ y may belong to (0, 255], i.e., any constant between 0 and 255 (including 255, but excluding 0), e.g. 10 or 12.5.

At step S200_10, a protection area $M_2$ is calculated based on both the first grayscale image $G_1$ and the second grayscale image $G_2$. Specifically, in some embodiments, the protection area $M_2$ may be calculated according to the following Equation (7):

$$\begin{cases} M_2(x,y)=0, & \text{if } G_1(x,y)-G_2(x,y)>T, \text{ or } G_2(x,y)>G_1(x,y) \\ M_2(x,y)=255, & \text{else} \end{cases} \qquad (7)$$

Where $M_2$ (x, y) represents a value of the protection area $M_2$ at pixel (x, y) (e.g., pixel 102 in FIG. 1), $G_1$ (x, y) represents the gray value of the first gray image $G_1$ at pixel (x, y), $G_2$ (x, y) represents a gray value of the second gray image $G_2$ at pixel (x, y), T is a non-negative constant, and x and y are non-negative integers. In some embodiments, T may belong to [0, 255], i.e., any constant between 0 and 255 (including 0 and 255), e.g. 150 or 170.5.

After that, the method may proceed to step S200_12. At step S200_10, the fusion coefficient image M is calculated based on the calculated first fusion image $M_1$ and the protection area $M_2$. Specifically, in some embodiments, the fusion coefficient image M may be calculated according to the following Equation (8):

$$M(x,y)=\min(M_1(x,y),M_2(x,y)) \qquad (8)$$

Where M(x, y) represents a value of the fusion coefficient image M at pixel (x, y) (e.g., pixel 102 in FIG. 1), $M_1$ (x, y) represents the value of the first fusion image $M_1$ at pixel (x, y); $M_2$ (x, y) represents a value of the protection region $M_2$ at pixel (x, y), and x, y are non-negative integers.

The method of calculating the fusion coefficient image M according to the embodiment of the present disclosure described in connection with FIG. 5 can reduce ghosting for example caused by moving lights, by calculating the protection area $M_2$, thereby improving the quality of the fused image.

Figure 6:
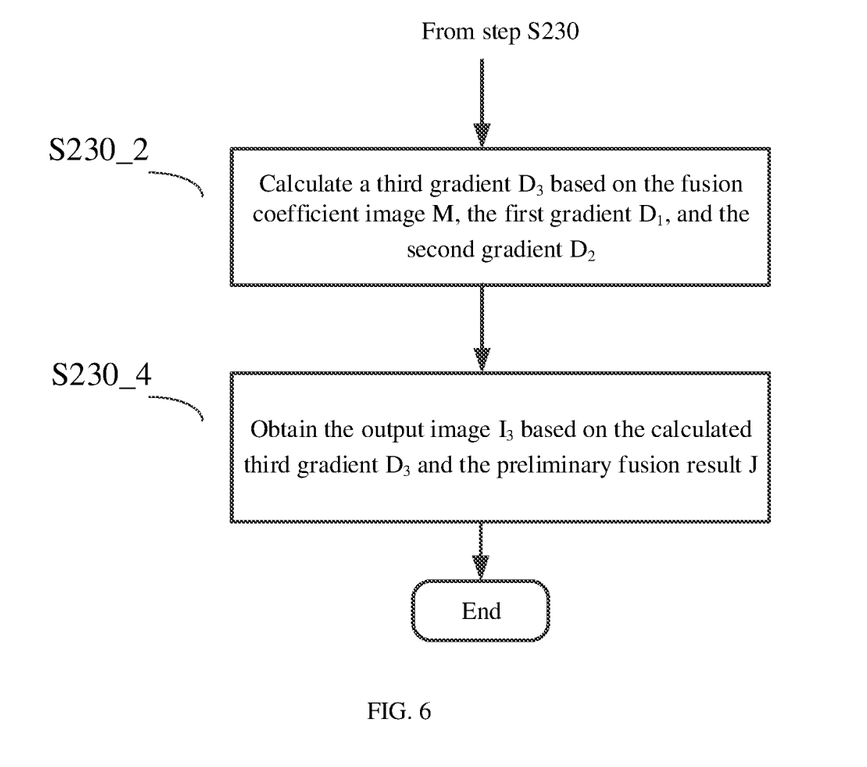
FIG. 6 is a schematic flowchart further illustrating obtaining the output image $I_3$ based on the calculated fusion coefficient image M, the first gradient $D_1$, the second gradient $D_2$, and the preliminary fusion result J in FIG. 2 or FIG. 3.

FIG. 6 is a schematic flow chart further illustrating obtaining the output image $I_3$ based on the calculated fusion coefficient image M, the first gradient $D_1$, the second gradient $D_2$, and the preliminary fusion result J in FIG. 2 or FIG. 3.

Referring to FIG. 6, in some embodiments of the present disclosure, the step S230 in FIG. 2 or FIG. 3, obtaining the output image $I_3$ based on the calculated fusion coefficient image M, the first gradient $D_1$ and the second gradient $D_2$ may include steps S230_2 and S230_4.

At step S230_2, third gradient $D_3$ is calculated based on the fusion coefficient image M, the first gradient $D_1$, and the second gradient $D_2$. Specifically, in some embodiments, the third gradient $D_3$ may be calculated based on the fusion coefficient image M, the first gradient $D_1$, and the second gradient $D_2$ according to the following equation (9):

$$\begin{cases} D_3 \wedge x(x,y) = D_1 \wedge x(x,y)*(255-M(x,y))+M(x,y)*D_2 \wedge x(x,y) \\ D_3 \wedge y(x,y) = D_1 \wedge y(x,y)*(255-M(x,y))+M(x,y)*D_2 \wedge y(x,y) \end{cases} \qquad (9)$$

Where $D_3\hat{\ }x$ (x, y) represents a gradient of the third gradient $D_3$ in the x direction at pixel (x, y) (for example, the pixel 102 in FIG. 1), $D_3\hat{\ }y$ (x, y) represents a gradient of the third gradient $D_3$ in the y direction at pixel (x, y), $D_1\hat{\ }x$ (x, y) represents a gradient of the first gradient $D_1$ in the x direction at pixel (x, y), $D_1\hat{\ }y$ (x, y) represents a gradient of the first gradient $D_1$ in the y direction at pixel (x, y), $D_2\hat{\ }x$ (x, y) represents a gradient of the second gradient $D_2$ in the x direction at pixel (x, y), $D_2\hat{\ }y$ (x, y) represents a gradient of the second gradient $D_2$ in the y direction at pixel (x, y), and x, y are non-negative integers.

Calculating the third gradient $D_3$ by the above equation 9 enables the fused image to have image gradient information of the second gradient $D_2$ in the highlight region while retaining its original image gradient information in the unexposed region of the first frame image $I_1$.

After calculating the third gradient $D_3$ and the preliminary fusion result J, the method may proceed to step S230_4. At step S230_4, the output image $I_3$ is obtained based on the calculated third gradient $D_3$ and the preliminary fusion result J, wherein a sum of the difference between the output image $I_3$ and the preliminary fusion result J and the difference between the gradient of the output image $I_3$ and the third gradient $D_3$ is a minimum. In the present disclosure, the minimum sum of the difference between the output image $I_3$ and the preliminary fusion result J and the difference between the gradient of the output image $I_3$ and the third gradient D3 can be understood as the output image $I_3$ can be obtained by the following optimization manner:

$$I_3=\mathrm{argmin}\{(D_3-J)^2+\alpha(\nabla I_3-D_3)^2\} \qquad (10)$$

Where, $\nabla I_3$ represents a gradient of $I_3$, $\alpha$ is a positive constant.

Alternatively, in some embodiments, the minimum sum of the difference between the output image $I_3$ and the preliminary fusion result J and the difference between the gradient of the output image $I_3$ and the third gradient $D_3$ can be understood as the output image $I_3$ can be obtained by the following optimization manner:

$$I_3 = \mathrm{argmin}\{\beta(D_3-J)^2 + \alpha(\nabla I_3 - D_3)^2\} \quad (11)$$

Where, $\nabla I_3$ represents the gradient of $I_3$, $\alpha$ and $\beta$ are positive constants.

Alternatively, in other embodiments, the minimum sum of the difference between the output image $I_3$ and the preliminary fusion result J and the difference between the gradient of the output image $I_3$ and the third gradient $D_3$ can be understood as the output image $I_3$ can be obtained by the following optimization manner:

$$I_3 = \mathrm{argmin}\{[\beta(D_3-J)^2 + \alpha(\nabla I_3 - D_3)^2]^p\} \quad (12)$$

Where, $\nabla I_3$ represents a gradient of $I_3$, $\alpha$ and $\beta$ are positive constant, and p is an integer (e.g. −2 or 2).

Specifically, in the process of the above optimization manner (i.e., solving the above equations 10, 11, and 12 by optimization), these equations can be solved by various optimization manners existing or to be developed in the future. In some embodiments, equations 10, 11, and 12 may be optimally solved by a multi-scale optimization manner to obtain the output image $I_3$.

Obtaining the output image $I_3$ by using the new algorithm based on gradient fusion and image reconstruction based on the fusion coefficient-based image M, the first gradient $D_1$ and the second gradient $D_2$ described in conjunction with FIG. 6 can make the reconstructed image approach the preliminary fusion result J in overall color and brightness, and make the gradient of the reconstructed image approach the calculated ideal fusion gradient $D_3$ as much as possible, thereby obtaining better fusion results in some scenes, e.g. in backlighting scenes of daytime.

It should be understood that although in the present disclosure, the output image $I_3$ can be obtained by the above optimization based on the third gradient $D_3$ and the preliminary fusion result J, the present disclosure is not limited thereto. That is, based on the third gradient $D_3$ and the preliminary fusion result J, the method of obtaining the output image $I_3$ by the above optimization manner or its variations is within the scope of this specification and the appended claims.

Figure 7:
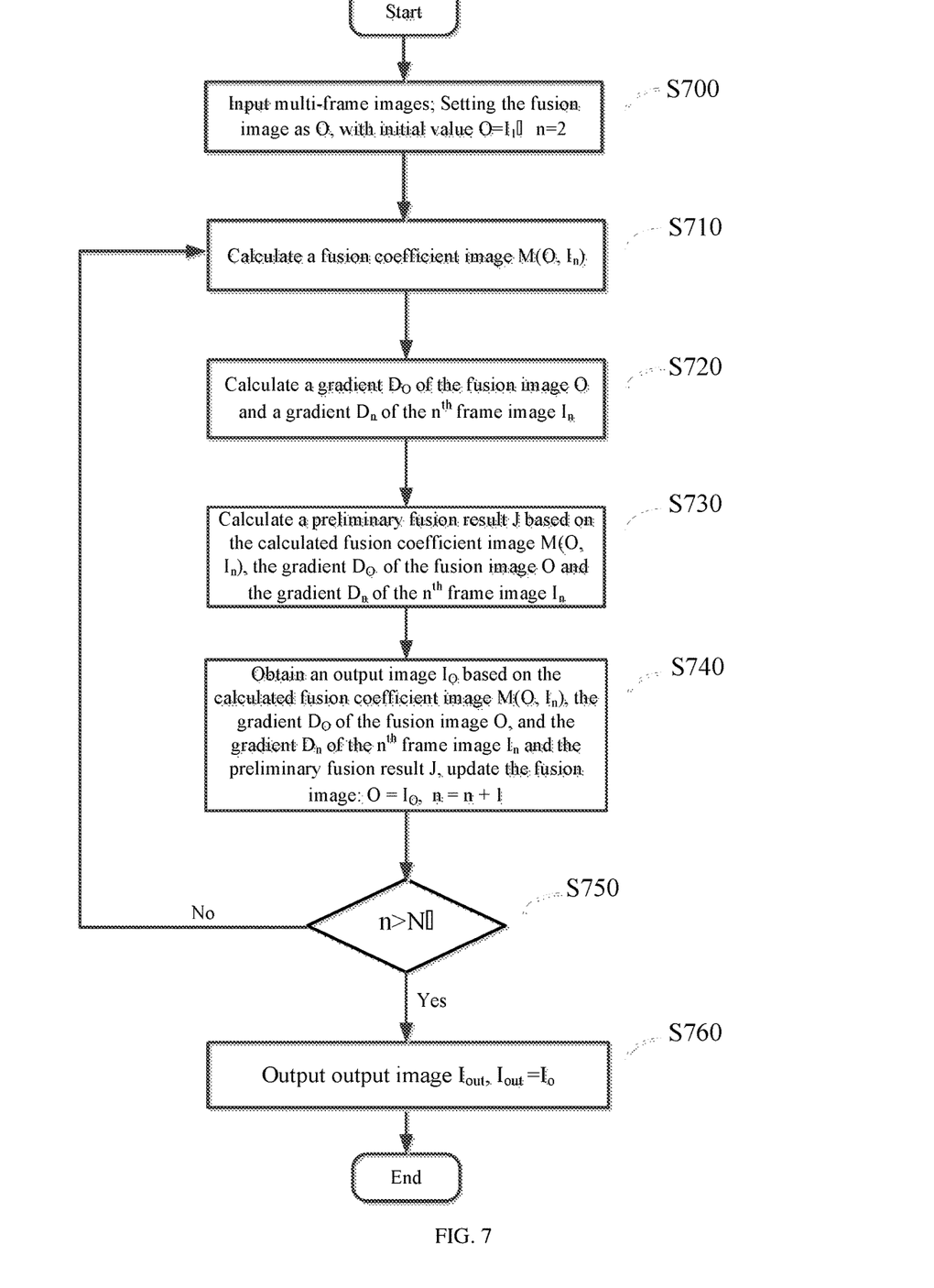
FIG. 7 is an example flowchart illustrating an image fusion method to fuse multi-frame images according to an embodiment of the present disclosure.

The image fusion method to fuse two frame images together according to the embodiment of the present disclosure has been described in detail above in connection with FIGS. 2 to 6. Hereinafter, the present disclosure will describe the image fusion method to fuse multi-frame images together according to an embodiment of the present disclosure in connection with FIG. 7. FIG. 7 is an example flowchart illustrating the image fusion method to fuse multi-frame images according to an embodiment of the present disclosure. For convenience of description, assume that the input image is N frames, where N>2; and assume that the input order of the input images is from bright to dark, that is, the brightness relation of the input multi-frame images is: $I_1 > I_2 > I_3 > \ldots > I_N$.

Referring to FIG. 7, the image fusion method according to the embodiment of the present disclosure may start at step S700 when fusing multi-frame images, e.g. N frame images. At step S700, a fusion image O may be set to $O = I_1$; and the initial value of n is set to n=2. After that, the method may loop through steps S710, S720, S730, and S740 until all the input images are fused together. Specifically, at step S710, a fusion coefficient image M(O, In) is calculated. At step S720, a gradient Do of the fusion image O and a gradient Dn of the nth frame image In are calculated. After that, the method may proceed to step S730. At step S730, a preliminary fusion result J is calculated based on the calculated fusion coefficient image M(O, In), the gradient $D_O$ of the fusion image O and the gradient Dn of the nth frame image In. After calculating the preliminary fusion result J, the method may proceed to step S740. At step S740, an output image $I_O$ is obtained based on the calculated fusion coefficient image M(O, In), the gradient $D_O$, the gradient Dn of the nth frame image In and the preliminary fusion result J; the fusion image is updated, the fusion image is updated to $O = I_O$; and n is set to n=n+1. Calculating the fusion coefficient image M(O, In) at step S710, calculating the gradient $D_O$ of the fusion image O and the gradient Dn of the nth frame image In at step S720, calculating the preliminary fusion result J based on the calculated fusion coefficient image M(O, In), the gradient $D_O$ of the fusion image O and the gradient Dn of the nth frame image In at step S730, and obtaining the output image $I_O$ based on the calculated fusion coefficient image M(O, In), the gradient $D_O$ of the fusion image O, the gradient Dn of the nth frame image In, and the preliminary fusion result J at step 740 are similar to steps S200, S210, S220, and S230 in FIGS. 2 and 3 above, and which will not be repeated here for simplicity. After that, it is judged whether fusions of all the input images are completed. Specifically, in some embodiments, it can be judged whether the fusions of all the input images are completed by judging whether n>N is true or not. If n>N is true (Yes), it indicates that the fusions of all the input images are completed, and then the method proceeds to step S750. At step 750, an output image Iout is output, where Iout=$I_O$. If n>N is not true (No), the method returns to step S710.

The image fusion method for fusing multi-frame images together according to the embodiment of the present disclosure described above in connection with FIG. 7 may fuse multi-frame images with different settings such as exposure time and/or ISO together. Compared with fusing two frame images, fusing multi-frame images together can better fuse the details captured by the multi-frame images, thereby obtaining a better fusion effect.

In addition, it should be understood that although the order of input images in the method shown in FIG. 7 is from the bright frames to the dark frames, the present disclosure is not limited thereto. In some embodiments, the image fusion method for fusing multi-frame images according to the embodiment of the present disclosure may be applied to multi-frame images whose input order is from dark frames to bright frames.

In the above, the present disclosure describes an example flow of the image fusion method to fuse two frame images and to fuse multi-frame images according to embodiments of the present disclosure in conjunction with FIGS. 2 to 7. Hereinafter, the present disclosure will describe an electronic apparatus, an electronic device, and a computer-readable storage medium that can be used to implement the image fusion method according to embodiments of the present disclosure in conjunction with FIGS. 8 to 10.

Figure 8:
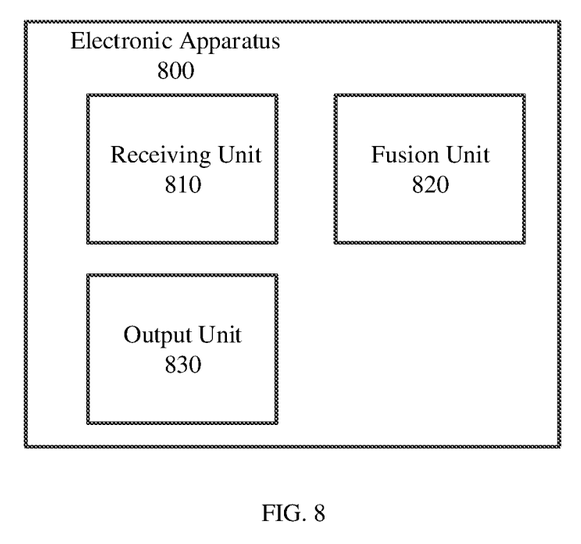
FIG. 8 is a schematic diagram of an electronic apparatus for image fusion according to an embodiment of the present disclosure.

FIG. 8 is a schematic diagram of an electronic apparatus 800 for image fusion according to an embodiment of the present disclosure.

Referring to FIG. 8, an electronic apparatus 800 for image fusion according to an embodiment of the present disclosure may include a receiving unit 810, a fusion unit 820, and an output unit 830, where the receiving unit 810 may receive input images, i.e., images to be fused, and the input images may be multiple images with different settings of exposure times and/or ISO etc.

The fusion unit 820 may perform the following operations: calculating a fusion coefficient image M based on a first frame image $I_1$ or based on both the first frame image $I_1$ and a second frame image $I_2$; calculating a first gradient $D_1$ of the first frame image $I_1$ and a second gradient $D_2$ of the second frame image $I_2$; calculating a preliminary fusion result J based on the calculated fusion coefficient image M, the first gradient $D_1$ and the second gradient $D_2$; and obtaining an output image $I_3$ based on the calculated fusion coefficient image M, the first gradient $D_1$, the second gradient $D_2$, and the preliminary fusion result J, wherein brightness of the first frame image $I_1$ is greater than brightness of the second frame image $I_2$, and wherein the fusion coefficient image M is used to mark fusion weights of pixels in the first frame image $I_1$.

After the fusion unit completes the fusions of the images, the output unit 830 may output the output image $I_3$.

Alternatively or additionally, the fusion unit 820 may also perform the image fusion method for fusing two frame images and the image fusion method for fusing multi-frame images described above in connection with FIGS. 2 to 7 to fuse two or more frame images together.

Figure 9:
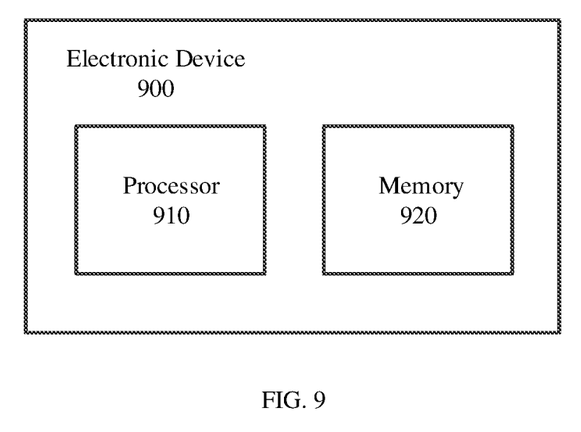
FIG. 9 is a schematic diagram of an electronic device for image fusion according to an embodiment of the present disclosure.

FIG. 9 is a schematic diagram of an electronic device 900 for image fusion according to an embodiment of the present disclosure. Referring to FIG. 9, the electronic device 900 for image fusion according to an embodiment of the present disclosure may include a processor 910 and a memory 920. The memory having instructions stored thereon, which, when executed by the processor, cause the processor to fuse two images together, a first frame image $I_1$ and a second frame image $I_2$, wherein the first frame image $I_1$ is a bright frame and the second frame image $I_2$ is a dark frame, by performing the following operations: calculating a fusion coefficient image M based on the first frame image $I_1$ or based on both the first frame image $I_1$ and the second frame image $I_2$; calculating a first gradient $D_1$ of the first frame image $I_1$ and a second gradient $D_2$ of the second frame image $I_2$; calculating a preliminary fusion result J based on the calculated fusion coefficient image M, the first gradient $D_1$ and the second gradient $D_2$; and obtaining an output image $I_3$ based on the calculated fusion coefficient image M, the first gradient $D_1$, the second gradient $D_2$, and the preliminary fusion result J, wherein brightness of the first frame image $I_1$ is greater than brightness of the second frame image $I_2$, and wherein the fusion coefficient image M is used to mark fusion weights of pixels in the first frame image $I_1$ (the bright frame).

Alternatively or additionally, the instructions, when executed by the processor, may also enable the processor to perform the image fusion method for fusing two frame images and the image fusion method for fusing multi-frame images according to the embodiments of the present disclosure described above in connection with FIGS. 2 to 7 to fuse two or more frame images together.

Figure 10:
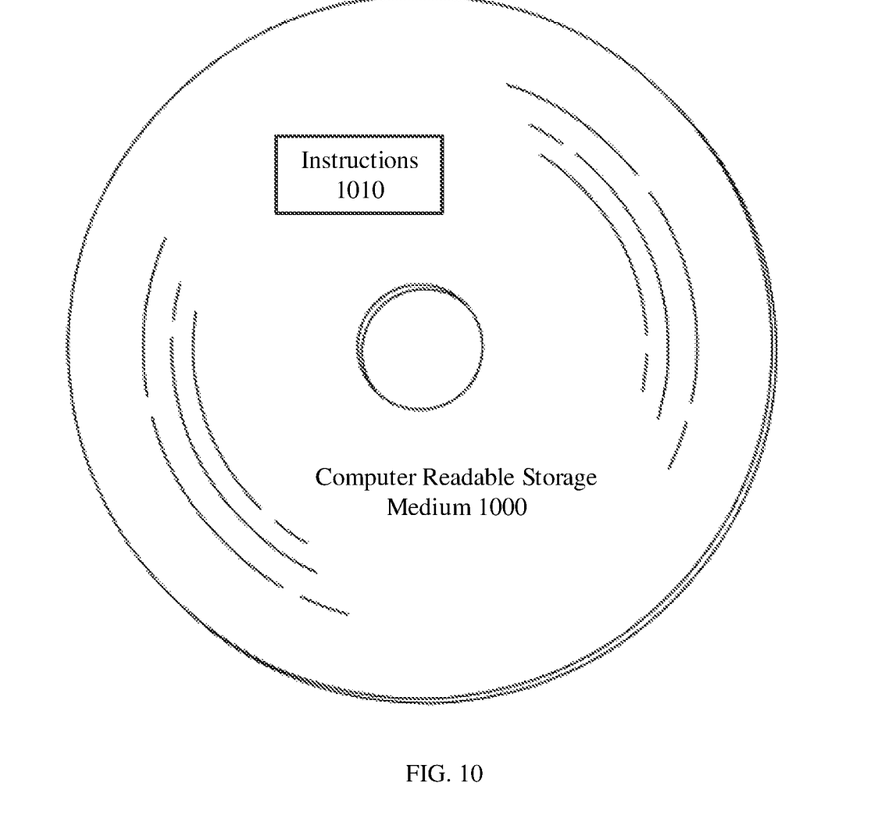
FIG. 10 is a schematic diagram of a computer readable storage medium for image fusion according to an embodiment of the present disclosure.

FIG. 10 is a schematic diagram of a computer readable storage medium 1000 for image fusion according to an embodiment of the present disclosure.

The computer readable storage medium 1000 illustrated in FIG. 10 having computer readable instructions 1010 stored thereon, which, when executed by a processor, can cause the processor to fuse two images together, a first frame image $I_1$ and a second frame image $I_2$, wherein the first frame image $I_1$ is a bright frame and the second frame image $I_2$ is a dark frame, by performing the following operations: calculating a fusion coefficient image M based on the first frame image $I_1$ or based on both the first frame image $I_1$ and the second frame image $I_2$; calculating a first gradient $D_1$ of the first frame image $I_1$ and a second gradient $D_2$ of the second frame image $I_2$; calculating a preliminary fusion result J based on the calculated fusion coefficient image M, the first gradient $D_1$ and the second gradient $D_2$; and obtaining an output image $I_3$ based on the calculated fusion coefficient image M, the first gradient $D_1$, the second gradient $D_2$, and the preliminary fusion result J, wherein brightness of the first frame image $I_1$ is greater than brightness of the second frame image $I_2$, and wherein the fusion coefficient image M is used to mark fusion weights of pixels in the first frame image $I_1$ (the bright frame).

Alternatively or additionally, the instructions, when executed by the processor, may also enable the processor to perform the image fusion method for fusing two frame images and the image fusion method for fusing multi-frame images according to the embodiments of the present disclosure described above in connection with FIGS. 2 to 7 to fuse two or more frame images together.

In the present disclosure, the electronic apparatus 800 and the electronic device 900 that can implement the image fusion method according to the embodiment of the present disclosure may be electronic devices that can capture images, for example, but not limited to, cameras, video cameras, smart phones, tablet personal computers, mobile phones, video phones, desktop PCs, laptop PCs, netbook PCs, personal digital assistants, or any electronic devices that can capture images. Alternatively, the electronic apparatus 800 and the computing system 900 that can implement the image fusion method according to the embodiment of the present disclosure may also be computing devices wired or wirelessly connected to electronic devices that can capture images.

In the present disclosure, the memory 920 may be a non-volatile memory device, for example, electrically erasable programmable read-only memory (EEPROM), flash memory, Phase Change Random Access Memory, (PRAM), Resistance Random Access Memory (RRAM), Nano Floating Gate Memory (NFGM), Polymer Random Access Memory, (PoRAM), Magnetic Random Access Memory (MRAM), ferroelectric random access memory (FRAM), etc.

In the present disclosure, the computer readable storage medium 1000 may be, for example but not limited to, an electronic, magnetic, optical, electromagnetic, infrared, or semiconductor system, apparatus, device, or propagation medium. More specific examples (a non-exhaustive list) of the computer readable storage medium may include the following items: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, such as a transmission medium supporting the Internet or an intranet, or a magnetic storage device. Since the program can be electronically captured via, for example, optical scanning to paper or other media, then compiled, interpreted or processed in an appropriate manner if necessary, and then stored in a computer memory, the computer readable storage medium can also be paper or other suitable media on which the program is printed. In the context of this document, a computer readable storage medium may be any medium capable of containing, storing, communicating, propagating, or transmitting a program for use by or used in connection with an instruction execution system, apparatus, or device. The computer readable storage medium may include a propagated data signal having computer readable program code embodied in baseband or as part of a carrier wave therewith.

In the present disclosure, instructions, for example, instructions stored in memory 920 in FIG. 9 or instructions 1010 in FIG. 10, may be written in any type of programming language, for example, an object-oriented programming language such as Java, Smalltalk, C++, or conventional procedural programming languages such as C programming language or similar programming languages. In addition, the program code composed of instructions may be executed as a stand-alone software package entirely on the user's computer, partly on the user's computer, partly on the user's computer and another partly on a remote computer or entirely on the remote computer or server.

In the present disclosure, a processor, for example, the processor 120 of FIG. 9 or the processor executing the instruction 1010 of FIG. 10, may refer to, for example, a data processing device implemented by hardware having physically structured circuitry to run desired operations including, for example, operations represented as code and/or instructions included in a program. In some example embodiments, the above hardware implemented data processing device may include, but is not limited to, a microprocessor, a Central Processing Unit (CPU), a processor core, a multi-core processor, a multi-processor, an application-specific integrated circuit (ASIC), and a Field Programmable Gate Array (FPGA).

Furthermore, those of ordinary skill in the art should understand that the units and algorithm steps of the examples described in connection with the embodiments disclosed herein can be implemented in electronic hardware, or computer software in conjunction electronic hardware. Whether these functions are implemented in hardware or software depends on the specific interoperable application and design constraints of the technical scheme. Skilled artisans may use different methods to implement the described functions for each specific interoperable application, but such implementation should not be considered beyond the scope of the present invention.

The basic principles of the present disclosure have been described above in connection with specific embodiments. However, it should be pointed out that the advantages, merits, effects, etc. mentioned in the present disclosure are merely examples and are not limiting. These merits, advantages, effects, etc. cannot be considered as necessary for various embodiments of the present disclosure. In addition, the specific details disclosed above are for the purpose of illustration and for ease of understanding only, and are not limiting. The above details do not limit the disclosure to be necessarily implemented by using the above specific details.

The block diagrams of elements, apparatuses, devices, and systems involved in the present disclosure are merely illustrative examples and are not intended to require or imply that connections, arrangements, and configurations must be made in the manner shown in the block diagrams. As will be recognized by those skilled in the art, these elements, apparatus, devices, systems may be connected, arranged, and configured in any manner. Words such as "including", "comprising", "having" and the like are open words that refer to "including but not limited to" and can be used interchangeably therewith. As used herein, the words "or" and "and" refer to the words "and/or" and may be used interchangeably unless the context clearly indicates otherwise. As used herein, the word "such as" refers to the phrase "such as but not limited to" and may be used interchangeably therewith.

In addition, as used herein, the "or" used in the enumeration of items beginning with "at least one" indicates a separate enumeration, so that, for example, the enumeration of "at least one of A, B, or C" means A or B or C, or AB or AC or BC, or ABC (i.e., A and B and C). Furthermore, the word "example" does not mean that the described example is preferred or better than other examples.

It should also be pointed out that in the system and method of the present disclosure, various components or steps can be decomposed and/or recombined. Such decomposition and/or recombination should be regarded as equivalent to the present disclosure.

Various changes, substitutions and alterations to the techniques described herein may be made without departing from the techniques of the teachings defined by the appended claims. Furthermore, the scope of the claims of the present disclosure is not limited to the specific aspects of the above-described processes, machines, manufacture, compositions of events, means, methods, and actions. Processes, machines, manufacture, compositions of events, means, methods or actions currently existing or later to be developed that perform substantially the same functions or achieve substantially the same results as the corresponding aspects described herein may be utilized. Accordingly, the appended claims include such processes, machines, manufacture, compositions of events, means, methods, or actions within the scope thereof.

The above description of the disclosed aspects is provided to enable any person skilled in the art to implement or use the present disclosure. Various modifications to these aspects will be readily apparent to those skilled in the art, and the general principles defined herein may be applied to other aspects without departing from the scope of the present disclosure. Therefore, the present disclosure is not intended to be limited to the aspects shown herein, but is to be accorded the widest scope consistent with the principles and novel features disclosed herein.

The above description has been given for purposes of illustration and description. Furthermore, this description is not intended to limit the embodiments of the present disclosure to the forms disclosed herein. Although a number of example aspects and embodiments have been discussed above, those skilled in the art will recognize certain variations, modifications, changes, additions and sub-combinations thereof.

What is claimed is:

1. An image fusion method, comprises:
   calculating a fusion coefficient image M based on a first frame image $I_1$ or based on both the first frame image $I_1$ and a second frame image $I_2$;
   calculating a first gradient $D_1$ of the first frame image $I_1$ and a second gradient $D_2$ of the second frame image $I_2$;
   calculating a preliminary fusion result J based on the calculated fusion coefficient image M, the first gradient $D_1$ and the second gradient $D_2$; and
   calculating a third gradient $D_3$ based on the fusion coefficient image M, the first gradient $D_1$, and a second gradient $D_2$;
   obtaining an output image $I_3$ based on the calculated third gradient $D_3$ and the preliminary fusion result J,
   wherein brightness of the first frame image $I_1$ is greater than brightness of the second frame image $I_2$, and wherein the fusion coefficient image M is used to mark fusion weights of pixels in the first frame image $I_1$, wherein the obtaining the output image $I_3$ based on the calculated third gradient $D_3$ and the preliminary fusion result J comprises: obtaining the output image $I_3$ by a following optimization manner:

$$I_3 = \mathrm{argmin}\{(D_3-J)^2 + \alpha(\nabla I_3 - D_3)^2\} \quad (1)$$

where $\nabla I_3$ represents a gradient of $I_3$ and $\alpha$ is a positive constant.

2. The method of claim 1,
wherein a sum of a difference between the output image $I_3$ and the preliminary fusion result J and a difference between a gradient of the output image $I_3$ and the third gradient $D_3$ is a minimum.

3. The method of claim 1, wherein calculating the fusion coefficient image M based on the first frame image $I_1$, comprises:
converting the first frame image $I_1$, into a first grayscale image $G_1$; and
calculating the fusion coefficient image M according to a following equation:

$$M(x,y) = 255 - (255 - G_1(x,y))*\gamma \quad (2)$$

where M(x, y) represents a value of the fusion coefficient image M at pixel (x, y), $G_1$ (x, y) represents a gray value of the first gray image $G_1$ at the pixel (x, y), $\gamma$ is a positive constant, and x and y are non-negative integers.

4. The method of claim 1, wherein calculating the fusion coefficient image M based on both the first frame image $I_1$, and the second frame image $I_2$ comprises:
converting the first frame image $I_1$, into a first grayscale image $G_1$;
converting the second frame image $I_2$ into a second grayscale image $G_2$;
calculating a first fusion image $M_1$ based on the first grayscale image $G_1$;
calculating a protection area $M_2$ based on both the first grayscale image $G_1$ and the second grayscale image $G_2$; and
calculating the fusion coefficient image M based on the calculated first fusion image $M_1$ and the protection area $M_2$.

5. The method of claim 4, wherein calculating the first fusion image $M_1$ based on the first grayscale image $G_1$ comprises calculating the first fusion image $M_1$ according to a following equation:

$$M(x,y) = 255 - (255 - G_1(x,y))*\gamma \quad (3)$$

where $M_1$ (x, y) represents a value of the first fusion image $M_1$ at pixel (x, y), $G_1$ (x, y) represents a gray value of the first gray image $G_1$ at the pixel (x, y), $\gamma$ is a positive constant, and x and y are non-negative integers; and wherein calculating the protection area $M_2$ based on both the first grayscale image $G_1$ and the second grayscale image $G_2$ comprises calculating the protection area $M_2$ according to a following equation:

$$\begin{cases} M_2(x,y) = 0, & \text{if } G_1(x,y) - G_2(x,y) > T, \text{ or } G_2(x,y) > G_1(x,y) \\ M_2(x,y) = 255, & \text{else} \end{cases} \quad (4)$$

where $M_2$ (x, y) represents a value of the protection area $M_2$ at the pixel (x, y), $G_1$ (x, y) represents the gray value of the first gray image $G_1$ at the pixel (x, y), $G_2$ (x, y) represents a gray value of the second gray image $G_2$ at the pixel (x, y), T is a non-negative constant, and x and y are non-negative integers.

6. The method of claim 4, wherein calculating the fusion coefficient image M based on the calculated first fusion image $M_1$ and the protection area $M_2$ comprises calculating the fusion coefficient image M according to a following equation:

$$M(x,y) = \min(M_1(x,y), M_2(x,y)) \quad (5)$$

where M(x, y) represents a value of the fusion coefficient image M at the pixel (x, y), and $M_1$(x, y) represents the value of the first fusion image $M_1$ at the pixel (x, y); $M_2$(x, y) represents the value of the protection region $M_2$ at the pixel (x, y), and x, y are non-negative integers.

7. The method of claim 2, wherein calculating the preliminary fusion result J based on the calculated fusion coefficient image M, the first gradient $D_1$ and the second gradient $D_2$ comprises calculating the preliminary fusion result J according to a following equation:

$$J(x,y) = D_1(x,y)*(255 - M(x,y)) + M(x,y)*D_2(x,y) \quad (6)$$

where J(x, y) represents a value of the preliminary fusion result J at pixel (x, y), $D_1$(x, y) represents a gradient value of the first gradient $D_1$ at the pixel (x, y), $D_2$ (x, y) represents a gradient value of the second gradient $D_2$ at the pixel (x, y), and M(x, y) represents a value of the fusion coefficient image M at the pixel (x, y).

8. The method of claim 2, wherein calculating the third gradient $D_3$ based on the fusion coefficient image M, the first gradient $D_1$, and the second gradient $D_2$ comprises calculating the third gradient $D_3$ according to a following equation:

$$D_3\hat{x}(x,y) = D_1\hat{x}(x,y)*(255 - M(x,y)) + M(x,y)*D_2\hat{x}(x,y)$$

$$D_3\hat{y}(x,y) = D_1\hat{y}(x,y)*(255 - M(x,y)) + M(x,y)*D_2\hat{y}(x,y) \quad (7)$$

where $D_3\hat{x}$ (x, y) represents a gradient of the third gradient $D_3$ in the x direction at pixel (x, y), $D_3\hat{y}$ (x, y) represents a gradient of the third gradient $D_3$ in the y direction at the pixel (x, y), $D_1\hat{x}$ (x, y) represents a gradient of the first gradient $D_1$ in the x direction at the pixel (x, y), $D_1\hat{y}$ (x, y) represents a gradient of the first gradient $D_1$ in the y direction at the pixel (x, y), $D_2\hat{x}$ (x, y) represents a gradient of the second gradient $D_2$ in the x direction at the pixel (x, y), $D_2\hat{y}$ (x, y) (x, y) represents a gradient of the second gradient $D_2$ in the y direction at the pixel (x, y), and x, y are non-negative integers.

9. The method of claim 1, further comprising:
aligning the first frame image $I_1$ and the second frame image $I_2$.

10. The method of claim 9, further comprising:
compensating the second frame image $I_2$ by a following equation before aligning the first frame image $I_1$ and the second frame image $I_2$:

$$I_2' = I_2 * b_2 / b_1 \quad (8)$$

where $I_2'$ is the compensated image of the second frame image $I_2$, $b_1$ is an average gray value of the first frame image $I_1$, and $b_2$ is an average gray value of the second frame image $I_2$.

11. An electronic device for image fusion, the electronic device comprising a processors and a memory having instructions stored thereon, which, when executed by the processors, cause the processor to:

calculate a fusion coefficient image M based on a first frame image $I_1$ or based on both the first frame image $I_1$ and a second frame image $I_2$;

calculate a first gradient $D_1$ of the first frame image $I_1$ and a second gradient $D_2$ of the second frame image $I_2$;

calculate a preliminary fusion result J based on the calculated fusion coefficient image M, the first gradient $D_1$ and the second gradient $D_2$; and calculate a third gradient $D_3$ based on the fusion coefficient image M, the first gradient $D_1$, and a second gradient $D_2$;

obtain an output image $I_3$ based on the calculated third gradient $D_3$ and the preliminary fusion result J, wherein brightness of the first frame image $I_1$ is greater than brightness of the second frame image $I_2$, and wherein the fusion coefficient image M is used to mark fusion weights of pixels in the first frame image $I_1$, wherein the obtaining the output image $I_3$ based on the calculated third gradient $D_3$ and the preliminary fusion result J comprises: obtaining the output image $I_3$ by a following optimization manner:

$$I_3 = \mathrm{argmin}\{(D_3-J)^2 + \alpha(\nabla I_3 - D_3)^2\} \quad (1)$$

where $\nabla I_3$ represents a gradient of $I_3$ and $\alpha$ is a positive constant.

12. An electronic device for image fusion, the electronic device comprising a processor and a memory having instructions stored thereon, which, when executed by the processor, cause the processor to:

calculate a fusion coefficient image M based on a first frame image $I_1$ or based on both the first frame image $I_1$ and a second frame image $I_2$;

calculate a first gradient $D_1$ of the first frame image $I_1$ and a second gradient $D_2$ of the second frame image $I_2$;

calculate a preliminary fusion result J based on the calculated fusion coefficient image M, the first gradient $D_1$ and the second gradient $D_2$; and obtain an output image $I_3$ based on the calculated fusion coefficient image M, the first gradient $D_1$, the second gradient $D_2$ and the preliminary fusion result J, wherein brightness of the first frame image $I_1$ is greater than brightness of the second frame image $I_2$, and wherein the fusion coefficient image M is used to mark fusion weights of pixels in the first frame image $I_1$, wherein the obtaining the output image $I_3$ based on the calculated third gradient $D_3$ and the preliminary fusion result J comprises: obtaining the output image $I_3$ by a following optimization manner:

$$I_3 = \mathrm{argmin}\{(D_3-J)^2 + \alpha(\nabla I_3 - D_3)^2\} \quad (1)$$

where $\nabla I_3$ represents a gradient of $I_3$ and $\alpha$ is a positive constant.

13. The electronic device of claim 12, wherein a sum of a difference between the output image $I_3$ and the preliminary fusion result J and a difference between a gradient of the output image $I_3$ and the third gradient $D_3$ is a minimum.

14. The electronic device of claim 12, wherein calculating the fusion coefficient image M based on both the first frame image $I_1$ and the second frame image $I_2$ comprises:

converting the first frame image $I_1$ into a first grayscale image $G_1$;

converting the second frame image $I_2$ into a second grayscale image $G_2$;

calculating a first fusion image $M_1$ based on the first grayscale image $G_1$;

calculating a protection area $M_2$ based on both the first grayscale image $G_1$ and the second grayscale image $G_2$; and calculating the fusion coefficient image M based on the calculated first fusion image $M_1$ and the protection area $M_2$.

15. The electronic device of claim 13, wherein calculating the third gradient $D_3$ based on the fusion coefficient image M, the first gradient $D_1$, and the second gradient $D_2$ comprises calculating the third gradient $D_3$ according to a following equation:

$$D_3\hat{}x(x,y) = D_1\hat{}x(x,y)*(255-M(x,y)) + M(x,y)*D_2\hat{}x(x,y)$$

$$D_3\hat{}y(x,y) = D1\hat{}y(x,y)*(255-M(x,y)) + M(x,y)*D_2\hat{}y(x,y) \quad (10)$$

where $D_3\hat{}x$ (x, y) represents a gradient of the third gradient $D_3$ in the x direction at pixel (x, y), $D_3\hat{}y$ (x, y) represents a gradient of the third gradient $D_3$ in the y direction at the pixel (x, y), $D_1\hat{}x$ (x, y) represents a gradient of the first gradient $D_1$ in the x direction at the pixel (x, y), $D_1\hat{}y$ (x, y) represents a gradient of the first gradient $D_1$ in the y direction at the pixel (x, y), $D_2\hat{}x$ (x, y) represents a gradient of the second gradient $D_2$ in the x direction at the pixel (x, y), $D_2\hat{}y$ (x, y) represents a gradient of the second gradient $D_2$ in the y direction at the pixel (x, y), and x, y are non-negative integers.

16. The electronic device of claim 13, wherein the instructions, when executed by the processor, further cause the processor to:

align the first frame image $I_1$, and the second frame image $I_2$, before performing the processing of claim 12.

17. The electronic device of claim 13, wherein the first frame image $I_1$, and the second frame image $I_2$ are two frame images with the highest brightness among image frames to be fused or two frame images with the lowest brightness among the image frames to be fused, the instructions, when executed by the processor, cause the processor further to:

in the case where the first frame image $I_1$, and the second frame image $I_2$ for an initial fusion are the two frame images with the highest brightness among the image frames to be fused, taking the output image $I_3$ of a result of the last fusion as the first frame image $I_1$, in the next fusion, and taking the frame image with the highest brightness among non-fused image frames of the image frames to be fused as the second frame image $I_2$ in the next fusion;

in the case where the first frame image $I_1$ and the second frame image $I_2$ for the initial fusion are the two frame images with the lowest brightness among the image frames to be fused, taking the frame image with the lowest brightness among non-fused image frames of the image frames to be fused as the first frame image $I_1$ in the next fusion, and taking the output image $I_3$ of the result of the last fusion as the second frame image $I_2$ in the next fusion;

fuse the first frame image 11 and the second frame image $I_2$ by using the method of claim 1 to obtain a new output image $I_3$; and repeat previous steps until fusions of all the image frames among the image frames to be fused are completed.

18. A non-transitory computer-readable storage medium storing instructions, which, when executed by a processor, cause the processor to:

calculate a fusion coefficient image M based on a first frame image $I_1$ or based on both the first frame image $I_1$ and a second frame image $I_2$;

calculate a first gradient $D_1$ of the first frame image $I_1$ and a second gradient $D_2$ of the second frame image $I_2$;

calculate a preliminary fusion result J based on the calculated fusion coefficient image M, the first gradient $D_1$ and the second gradient $D_2$; and calculate a third gradient $D_3$ based on the fusion coefficient image M, the first gradient $D_1$, and a second gradient $D_2$;

obtain an output image $I_3$ based on the calculated third gradient $D_3$ and the preliminary fusion result J, wherein brightness of the first frame image $I_1$ is greater than brightness of the second frame image $I_2$, and wherein the fusion coefficient image M is used to mark fusion weights of pixels in the first frame image $I_1$, wherein the obtaining the output image $I_3$ based on the calculated third gradient $D_3$ and the preliminary fusion result J comprises: obtaining the output image $I_3$ by a following optimization manner:

$$I_3 = \mathrm{argmin}\{(D_3-J)^2 + \alpha(\nabla I_3 - D_3)^2\} \tag{1}$$

where $\nabla I_3$ represents a gradient of $I_3$ and $\alpha$ is a positive constant.

* * * * *